Nov. 24, 1970 F. J. POTTER 3,543,051

ELECTRICAL SWITCHING ARRANGEMENTS INCLUDING
TRIGGERABLE AVALANCHE DEVICES

Filed Dec. 28, 1966

INVENTOR.
FRANK J. POTTER

BY Hoffman Stone

ATTORNEY

United States Patent Office 3,543,051
Patented Nov. 24, 1970

3,543,051
ELECTRICAL SWITCHING ARRANGEMENTS INCLUDING TRIGGERABLE AVALANCHE DEVICES

Frank J. Potter, Webster, N.Y., assignor to Stromberg-Carlson Corporation, Rochester, N.Y., a corporation of Delaware Filed Dec. 28, 1966, Ser. No. 605,272
Int. Cl. H03k *17/00*
U.S. Cl. 307—252 4 Claims

ABSTRACT OF THE DISCLOSURE

An electrical circuit including a triggerable avalanche device connected in a signal circuit wherein a control circuit applies a switching signal to the gate electrode to render the device conductive and also isolates the gate electrode to block current flow therethrough when the device is conductive.

This invention relates to a novel electrical switching arrangement, and, more particularly, to such arrangements using semi-conductor devices in ways that are especially advantageous for use in switching matrices in signalling systems such as, for example, telephone exchanges.

The use of solid state triggerable avalanche devices in signal switching systems has previously been suggested. See, for example, Pat. No. 3,197,546 issued to Stirling. The previous circuit arrangements, however, have been subject to certain disadvantages, especially when used in telephone switching systems wherein a signal must pass through a relatively large number of crosspoints. The difficulties relate to attenuation of the signal, called insertion loss, as it passes through the system, and to the need to make special provision apart from the matrix of solid state devices for applying so-called ringing voltage to a called subscriber's line. The ringing voltage is A.C., normally about 90 volts r.m.s., and in systems heretofore proposed would be effective to switch the solid state devices from their ON to their OFF conditions.

Accordingly, one important object of the present invention is to provide an improved circuit arrangement especially suitable for telephone switching systems in which the insertion loss is relatively low, not significantly greater than the insertion loss in a system using electromechanical relays. Another object is to provide a solid state electronic switching system especially suitable for use in telephone switching systems and capable of transmitting ringing signals of the conventionally used alternating current type.

Figure 1:
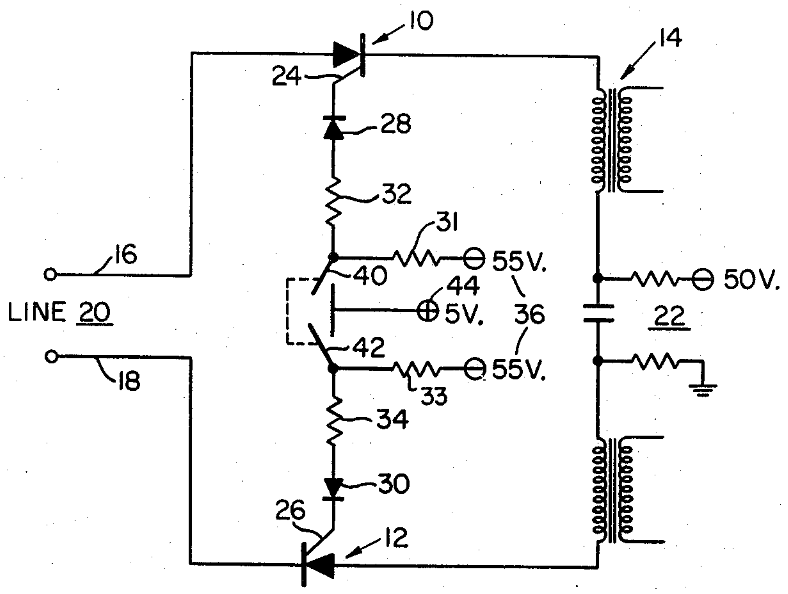
Figure 2:
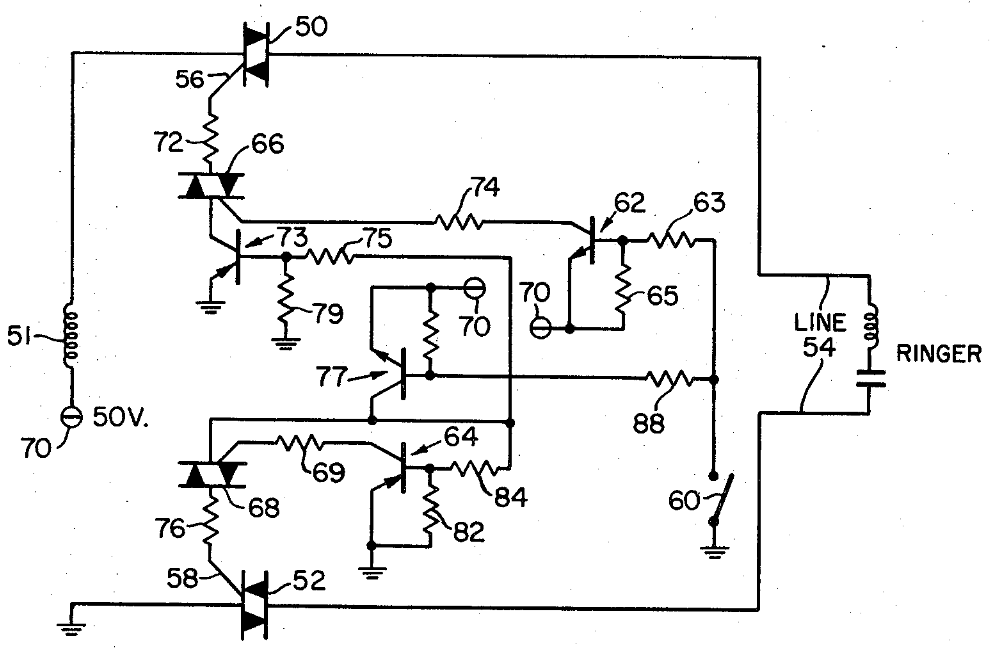

Two illustrative embodiments of the invention will now be described in connection with the accompanying drawing, wherein:

FIG. 1 is a schematic circuit diagram of a single crosspoint in a telephone switching matrix according to the invention; and, FIG. 2 is a schematic circuit diagram of a crosspoint in accordance with an alternative embodiment of the invention.

Briefly, in accordance with a first feature of the invention, a telephone switching crosspoint arranged in a balanced signal configuration includes two triggerable solid state avalanche devices of the type known as silicon controlled rectifiers (SCR's). The central office control equipment is arranged to apply a trigger signal to the gate electrodes of the SCR's to turn them ON when it is desired to effect a connection at the crosspoint and to hold them ON during dialling. The central office battery supply is thereafter effective to maintain the necessary holding current to keep the SCR's in their ON condition for voice signal transmission until the line loop is broken by the subscriber's going on hook. Provision is made for isolating the gate electrodes so that no gate current flows after the signal ends, such as would otherwise load the SCR's and cause attenuation of the signal.

According to another feature of the invention, semi-conductor devices of the type known as Triacs are used at the crosspoint, and arrangements are made to supply trigger current to their gate electrodes during the passage of ringing current though them. A Triac is a relatively complex semi-conductor device which is described in some detail in an article in the "Proceedings of the IEEE" for April 1965 at page 355 et seq., entitled "Bi-Directional Triode PNPN Switches," by Gentry, Scace, and Flowers. The device is characterized by exhibiting a relatively high impedance and a relatively high break-down voltage in both directions between its major terminals until a trigger voltage of either negative or positive polarity is applied between its gate terminal and one of its major terminals, whereupon the impedance between its major terminals becomes very small. The device will remain in its low impedance state so long as a minimum current, called its holding current, is maintained through it between its major terminals. In the absence of a trigger signal between the gate electrode and one of the major terminals, the device will revert to its high impedance condition when the current through it falls below the value of the holding current.

In accordance with the invention, the control circuitry is arranged to supply trigger current to the Triacs during the entire ringing period, whereby, even though current ceases to flow between the main terminals momentarily twice during each cycle of the ringing current, they remain in their highly conductive, low impedance states. When the called party goes off hook, the trigger current may be stopped and the gate terminals of the Triacs blocked so no gate current can flow to attenuate the voice signals. The Triacs are thereafter maintained to their ON condition by the line current from the main battery of the exchange, or, alternatively, gate current may be continued for the duration of the call.

Referring now to the drawings, FIG. 1 illustrates schematically a switching crosspoint for a telephone switching matrix including two SCR's 10 and 12 and a conventional bridging transformer 14. The cathode of one SCR 10 is connected to one terminal of the transformer 14 and the anode of the second SCR 12 is connected to the opposite terminal of the same winding of the transformer 14. The anode-to-cathode circuit paths in the SCR's 10 and 12 are in series in opposite respective leads 16 and 18 of the subscribers line 20, between the line 20 and the transformer 14, and they are oriented so that the central office D.C. power supply 22 biases them in their forward direction when the line circuit is closed. A similar arrangement would be connected across the secondary winding of the transformer 14, and a balanced matrix arrangement of the SCR's 10 and 12, which feed the transformer 14, taken together with the transformer constitutes a link circuit in the telephone exchange, as will readily be understood by those familiar with telephone switching art, and in accordance with the principles illustrated and explained in the copending patent application of Barrie Brightman, Ser. No. 566,830, filed July 21, 1966, entitled "Solid State Space Division Switchboard," and assigned to the present assignee.

Control signals are applied to the gate electrodes 24 and 26, respectively of the SCR's 10 and 12 for triggering the SCR's into their conductive modes. These signals would ordinarily be generated by a portion of the common control equipment of the central office known as a scanner, but are indicated schematically in the drawing herein as being generated by the operation of mechanical switches 40 and 42. The gate electrodes 24 and 26 are normally connected through respective diodes 28 and 30 and respective pairs of series connected resistors 31 and 32, and 33 and 34 to a source 36 of biasing potential which is more negative than the voltages normally present at the anodes and cathodes of the SCR's 10 and 12. The diodes 28 and 30 are oriented with their cathodes connected to to the gate electrodes 24 and 26 so that they are normally biased in the back direction and present a high impedance to prevent current flow through the gate electrodes 24 and 26. Until they are turned on, therefore, the SCR's 10 and 12 remain in their normal, high impedance state, and there is no connection at the crosspoint.

When the subscriber on the line 20 goes off hook, the central office control equipment generates a signal, which overcomes the effect of the biasing voltage 36, and biases the diodes 28 and 30 in the forward direction to cause current to flow through the gate electrodes 24 and 26, thereby turning the SCR's ON. This signal from the control equipment is schematically indicated by closing the switches 40 and 42 which then connect the gate electrodes to an auxiliary voltage source 44 of positive polarity. The signal is maintained until the subscriber completes dialling, so that the lack of line current does not cause the SCR's to turn off during intervals when the dial switch (not shown) is open. In their ON condition, the SCR's exhibit an extremely low anode-to-cathode impedance.

After completion of dialling, the switches 40 and 42 are opened, and the diodes 28 and 30 again become back biased. The SCR's are thereafter maintained in their ON condition by the line current, which flows responsively to the central office battery 22 so long as the subcriber's hook switch remains closed. With the normal biasing voltage 36 applied across the diodes 28 and 30 and the respective gate electrodes 24 and 26, no gate current flows to shunt the signal and cause undesired insertion loss. This is an important feature in the operation of a telephone system, because, in most instances, the signal must pass through several links in an exchange, and even through several exchanges in order to effect a connection between two different subscriber's lies. The insertion loss is cumulative factor, and for satisfactory operation at reasonable expense, it must be minimized.

In the system shown in FIG. 1, using SCR's, it is not possible to pass ringing currents through the crosspoint, because the ringing current is normally an alternating current having a peak value considerably larger than the value of the battery voltage, which is relied on to maintain the holding curernt through the SCR's 10 and 12. If it were attempted to pass the ringing current through the crosspoint, the SCR's would switch to their OFF condition during the first occurrence of the half cycle that opposes the battery voltage 22. Other provision must be made, therefore, when using this type of crosspoint, to apply the ringing voltage to the subscribers' line 20. Such arrangements have been devised and are known in the art.

Ringing curernts can be handled, however, in the crosspoint shown in FIG. 2, which represents an alternative modification of the invention, and makes use of semi-conductor devices of the type hereinabove referred to known as Triacs. In the arrangement shown, a pair of main Triacs 50 and 52 are connected with their principal terminals in series in opposite respective sides of the line 54. The common control equipment is arranged to produce an ON control signal that endures until the end of the ringing period, that is, until the called subscriber goes on hook. Alternatively, the ON control signal may be maintained for the entire duration of the call. The gate currents required to keep the Triacs 50 and 52 positively ON are so small that they do not significantly load the voice signal transmitted through the Triacs, and maintaining the ON control signal avoids the possibility that the Triacs might be accidently cut off by a momentary stoppage of the holding current such as could be caused by a line voltage surge or an induced transient.

The control signal is schematically indicated as being produced responsively to closing of a switch 60. Closing of the switch 60 turns on a pair of transistors 62 and 64, which in turn apply signals to the gate electrodes of a pair of auxiliary Triacs 66 and 68. The auxiliary Triacs 66 and 68 are then held ON by the transistors 62 and 64 until such time as the switch 60 is opened. The auxiliary Triacs 66 and 68 are connected to the gate electrodes 56 and 58 of the main Triacs 50 and 52 so that as long as the auxiliary Triacs are held in their ON condition, the main Triacs are constantly supplied with gate current and remain in their low impedance state for both directions of current flow between their principal electrodes. They thus pass the A.C. ringing current without difficulty.

It may also be noted that the normal breakdown voltage of the Triacs is safely greater than the maximum voltage that may appear across them in this crosspoint when they are in their OFF, or high impedance condition.

Details of the circuit connections will now be described. As shown, one side of the line 54 is connected through one main Triac 52 to ground. The other side is connected through the other main Triac 50, and through the output coil 51 of the ringing voltage supply to the terminal 70 of the battery, which is about 50 volts negative relative to ground. The gate electrode of the Triac 50 is connected through a limiting resistor 72 to one of the main terminals of the first auxiliary Triac 66. The other main terminal of the first auxiliary Triac 66 is connected to the collector of an auxiliary PNP transistor 73, the emitter of which is grounded, and the base of which is connected through a limiting resistor 75 to the collector of a control transistor 77, and through another resistor 79 to ground. The gate electrode of the first auxiliary Triac 66 is connected through a limiting resistor 74 to the collector of the NPN transistor 62, the emitter of which is connected to the negative terminal 70 of the main battery. The base of the transistor 62 is connected through a limiting resistor 63 to the fixed contact of the switch 60, and through a bias control resistor 65 to its own emitter. When the switch 60 is open, the base of the transistor 62 is at the same potential as its emitter, and the transistor 62 is cut off. When the switch 60 is closed, its fixed contact is grounded. The potential of the base of the transistor 62 is then less negative than its emitter and the emitter to collector circuit path through the transistor is conductive.

When the transistors 62 and 73 become conductive, the first auxiliary Triac 66 is gated ON, effectively grounding the gate of the main Triac 50 through the transistor 73. The auxiliary Triac 66 is needed to protect the transistor 62 against overvoltage. When ringing voltage is applied between the main Triacs 50 and 52 during times when the circuit is in its OFF condition, the impedance between the main terminals of the Triacs and their respective gate terminals may be relatively small on alternate half cycles of the ringing voltage. In such case, the voltage appearing between the gate terminal of the main Triac 50 and the negative terminal 70 of the battery could exceed the collector breakdown voltage of the transistor 62 and thereby cause the circuit to trigger to its ON condition. With the auxiliary Triac 66 connected between the main Triac 50 and the transistor 62, this possibility is avoided.

The connections for the other main Triac 52 are slightly different because of the polarity of the battery 70. Its main terminals are connected in series in the opposite side of the line 54 from the first Triac 50. Its gate electrode is connected through the second auxiliary Triac 68 and the control transistor 77 to the battery terminal 70. The gate electrode of the second auxiliary Triac 68 is connected through a limiting resistor 69 to the collector of the PNP transistor 64. The base of the transistor 64 is connected to its emitter through a bias control resistor 82 to keep the transistor 64 normally cut off. The base of the transistor 64 is also connected through a limiting resistor 84 to the collector of the control transistor 77. The base of the control transistor 77 is connected through a limiting resistor 88 to the fixed contact of the switch 60. When the control transistor 77 comes ON in response to closing of the switch 60, it turns on the transistor 64, which then turns on the auxiliary Triac 68 to trigger the main Triac 52 into its highly conductive state.

When it is ON, the control transistor 77 provides a direct connection between the main terminal of the auxiliary Triac 68 and the negative battery terminal 70, thereby supplying gate current to the main Triac 52. The control transistor 77 also turns ON the transistor 73, thus effectively grounding the main terminal of the other auxiliary Triac 66 to allow gate current to flow in the main Triac 50. The transistors 62 and 64 are kept ON to maintain gate current in the auxiliary Triacs 66 and 68, respectively.

After the connection at the crosspoint is effected by turning the two main Triacs 50 and 52 ON, the switch 60 is held closed during the entire ringing period, until the called party goes off hook. Thereafter, the switch 60 may be opened, cutting off the transistors 62 and 64, and the transistors 73 and 77 that are in series with the main terminals of the auxiliary Triacs 66 and 68, thereby positively cutting off the auxiliary Triacs and the gate current in the main Triacs 50 and 52. The main Triacs 50 and 52 will continue to be held ON by the line current to maintain the connection at the crosspoint until the subscriber on the line 54 goes back on hook. Thereupon the main Triacs 50 and 52 will revert to their non-conductive, high impedance state.

Alternatively, the switch 60 may be kept closed for the full duration of the call and be opened only when the subscriber goes back on hook. The gate current drawn from the main Triacs 50 and 52 will not significantly attenuate the voice signals passing through them.

What is claimed is:

1. An electrical switching circuit comprising a first triggerable semi-conductor avalanche device, said avalanche device being bidirectionally conductive, means connecting the main terminals of said device in series in a signalling circuit, means for applying a potential between the main terminals of said device, means for applying a trigger potential between the gate electrode of said device and one of its main terminals, means for isolating the gate electrode to block current flow therethrough during time when said device is in its ON condition, and wherein said isolating means includes a second bidirectional conductive triggerable semiconductor avalanche device connected in series with the gate electrode of said first named device.

2. An electrical switching circuit in accordance with claim 1, wherein the switching circuit is arranged in a balanced configuration with one of said devices in each of two arms of the circuit, and said potential means, said trigger means, and said isolating means are applicable to both of said devices.

3. An electrical switching circuit in accordance with claim 1, wherein said first and second avalanche devices are Triacs, and means for positively cutting off said second Triac.

4. An electrical switching circuit in accordance with claim 5, wherein said positive cutoff means includes a transistor connected in series with said second Triac.

References Cited

UNITED STATES PATENTS

| | | | |
|---|---|---|---|
| 3,235,750 | 2/1966 | Anderson et al. | 307—255 |
| 3,283,177 | 1/1966 | Cooper | 307—232 |

OTHER REFERENCES

G. E. application Note 90.6, Use of Complementary Transistors in Switching Circuits, by Stasior, page 6, May 1962.

IBM Tech. Disclosure Bulletin, Gruodis, vol. 4, No. 9, February 1962, pp. 54–55.

JOHN S. HEYMAN, Primary Examiner

B. P. DAVIS, Assistant Examiner

U.S. Cl. X.R.

307—259, 305, 318